United States Patent [19]
Urano et al.

[11] Patent Number: 5,940,599
[45] Date of Patent: Aug. 17, 1999

[54] DATA PROCESSOR

[75] Inventors: Miki Urano, Wakayama; Keizo Sumida, Osaka, both of Japan

[73] Assignee: Matsushita Electric Industrial Co., Ltd., Osaka, Japan

[21] Appl. No.: 08/957,160

[22] Filed: Oct. 24, 1997

[30] Foreign Application Priority Data

Oct. 29, 1996 [JP] Japan .................................... 8-286356

[51] Int. Cl.⁶ .................................................. G06F 13/00
[52] U.S. Cl. .......................................... 395/280; 395/559
[58] Field of Search ..................... 395/280, 555, 395/559, 881; 375/354; 370/503; 327/141

[56] References Cited

U.S. PATENT DOCUMENTS

| | | |
|---|---|---|
| 5,272,729 | 12/1993 | Bechade et al. .................... 375/371 |
| 5,485,602 | 1/1996 | Ledbetter et al. . | |
| 5,598,447 | 1/1997 | Usui ..................................... 375/376 |
| 5,811,998 | 9/1998 | Lundberg et al. ..................... 327/156 |

FOREIGN PATENT DOCUMENTS

| | | |
|---|---|---|
| 0497441 | 1/1992 | European Pat. Off. . |
| 0645717 | 8/1994 | European Pat. Off. . |
| 02085951 | 3/1990 | Japan . |

Primary Examiner—Gopal C. Ray
Attorney, Agent, or Firm—McDermott, Will & Emery

[57] ABSTRACT

A start signal is generated which selects, from among a plurality of sub-periods resulting from division of one cycle period of an external clock signal and each having a length equivalent to one cycle period of an internal clock signal, a sub-period at a corresponding position to a setup time of an external device. When the start signal is generated after a CPU (central processing unit) issues a transmission request signal, there is made a transition to a transmission state. An address signal to the external device is held until data transmission starts between the CPU and the external device in synchronization with the external clock signal in the transmission state.

12 Claims, 14 Drawing Sheets

DATA PROCESSOR

BACKGROUND OF THE INVENTION

This invention relates to a data processor for handling data in synchronization with an internal clock signal having a higher frequency than an applied external clock signal and for performing data transmission with an external device in synchronization with the external clock signal.

In the case that a slow external device, such as a memory and a coprocessor, is coupled to a data processor containing therein a fast central processing unit (CPU), a clock generation circuit is disposed in the data processor for generating from an external clock signal an internal clock signal having a frequency which is an integral multiple of the frequency of the external clock signal. The CPU executes data processing in synchronization with the internal clock signal and issues a data transmission request in synchronization with the internal clock signal; however, the transmission of data between the CPU and the external device must synchronize with the external clock signal.

External devices have their respective native setup times. For instance, it is not until a certain length of time elapses exceeding the setup time of an external device after an address signal that is applied to the external device is determined that data transmission is actually allowed to commence.

There have been demands for a fast data processor capable of guaranteeing the setup time of various external devices and of realizing data transmission with an external device in synchronization with an external clock signal. However, such demands have not been realized yet.

SUMMARY OF THE INVENTION

Accordingly, an object of the present invention is to provide technology capable of flexibly dealing with changes in the external device setup time in a data processor for handling data in synchronization with an internal clock signal having a higher frequency than an applied external clock signal and for performing data transmission with an external device in synchronization with the external clock signal.

In order to achieve the object, the present invention provides an improved data processor which allows a start signal to select, from among a plurality of sub-periods as a result of division of one cycle period of an external clock signal by one cycle period of an internal clock signal, an arbitrary sub-period.

The present invention is embodied in a data processor which employs the following organization. The data processor comprises (a) a clock generation circuit for generating from an external clock signal an internal clock signal having a frequency which is an integral multiple of that of the external clock signal, (b) a processing means for processing data in synchronization with the internal clock signal, (c) a bus interface for controlling data transmission between the processing means and the external device, (d) a start signal generation circuit for generating a start signal which selects, from among a plurality of sub-periods resulting from division of one cycle period of the external clock signal and each having a length equivalent to one cycle period of the internal clock signal, a sub-period at a corresponding position to the setup time of the external device, and (e) a state control circuit for controlling an internal state of the data processor in order that the data processor may make a transition to a state of transmission when the state control circuit receives the start signal after having received a transmission request signal issued from the processing means in synchronization with the internal clock signal. The bus interface has a function to pass an address signal, issued together with the transmission request signal from the processing means, to the external device and further has a function to hold the address signal that is fed to the external device until data transmission starts between the processing means and the external device in the transmission state in synchronization with the external clock signal.

As a result of such arrangement, it becomes possible to change the time of starting data transmission according to an external device setup time, whereby the setup time of various external devices can be guaranteed and data transmission in synchronization with the external clock signal can be realized.

DETAILED DESCRIPTION OF THE INVENTION

Figure 1:
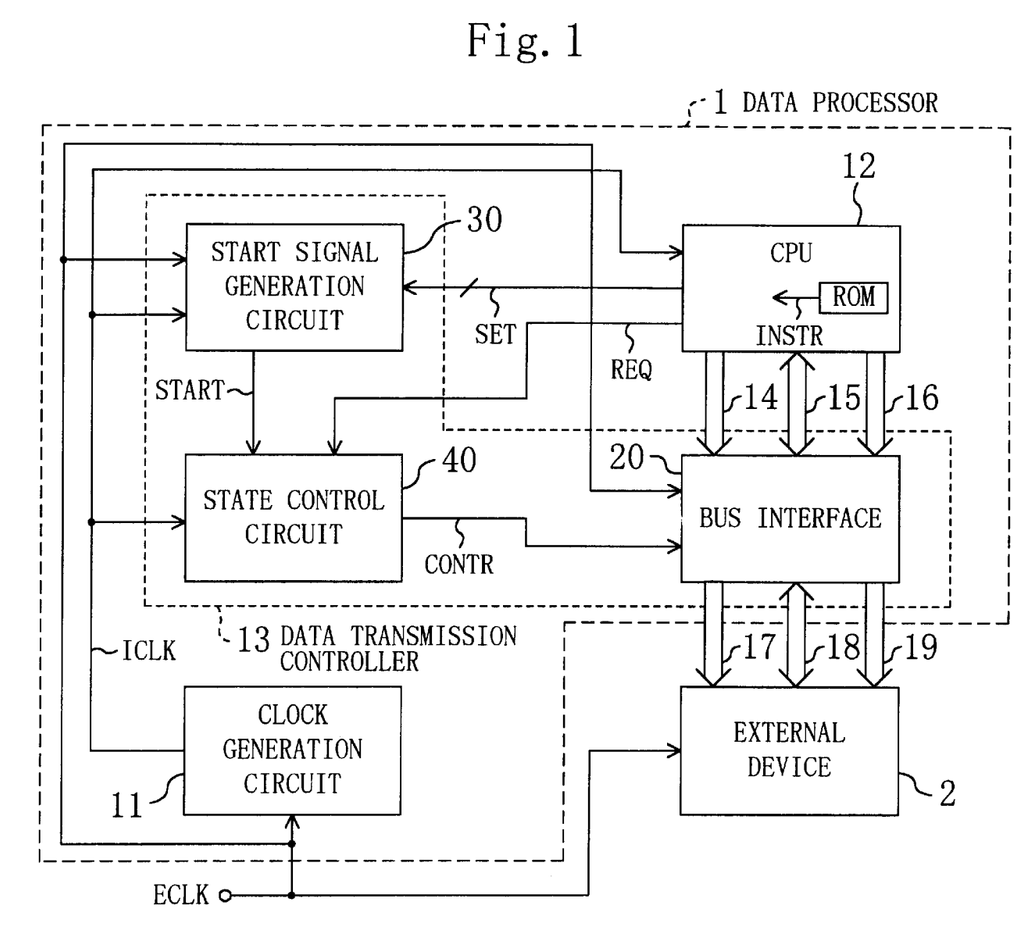
FIG. 1 is a block diagram illustrating an example of the organization of a data processor in accordance with the present invention.

Referring first to FIG. 1, a data processor of the present invention is shown. The data processor 1 of FIG. 1 is a data-processing device capable of performing data transmission with an external device 2 having a specific setup time, in synchronization with an external clock signal ECLK. The data processor 1 has a clock generation circuit 11, a CPU (processing means) 12, and a data transmission controller 13. The clock generation circuit 11 is formed of a known PLL (phase-locked loop), to generate an internal clock signal ICLK having a frequency which is four times greater than that of SIGNAL ECLK. The CPU 12 performs data processing, according to an instruction INSTR sequentially supplied from a built-in ROM (read only memory) and in synchronization with SIGNAL ICLK. At the time of receiving a transmission request signal REQ from the CPU 12, the data transmission controller 13 controls the transmission of data between the CPU 12 and the external device 2 in synchronization with SIGNAL ECLK. The data transmission controller 13 has a bus interface 20, a start signal generation circuit 30, and a state control circuit 40. Disposed between the CPU 12 and the bus interface 20 are an address bus 14, a data bus 15, and a control bus 16. Disposed between the bus interface 20 and the external device 2 are an address bus 17, a data bus 18, and a control bus 19. If the external device 2 is a memory, then data are transmitted over the data buses 15 and 18. On the other hand, if the external device 2 is a coprocessor, then instructions (and data) are transmitted over these data buses. The bus interface 20 controls the transmission of data between the CPU 12 and the external device 2, in other word such data transmission is controlled by the bus interface 20 to start in synchronization with the rising edge of SIGNAL ECLK. The start signal generation circuit 30 is a circuit for generating a start signal START which selects, from among four sub-periods as a result of equal-division of one cycle period of SIGNAL ECLK, a sub-period at a corresponding position to the setup time of the external device 2. The selecting of a sub-period is carried out based on a set value signal SET supplied from the CPU 12 to the start signal generation circuit 30. The state control circuit 40 controls the internal state of the data processor 1 in synchronization with SIGNAL ICLK in order that the data processor 1 makes a state-transition to the state of transmission when the state control circuit 40 receives SIGNAL START after having received SIGNAL REQ issued in synchronization with SIGNAL ICLK from the CPU 12. The state control circuit 40 sends a control signal CONTR to the bus interface 20.

Figure 2:
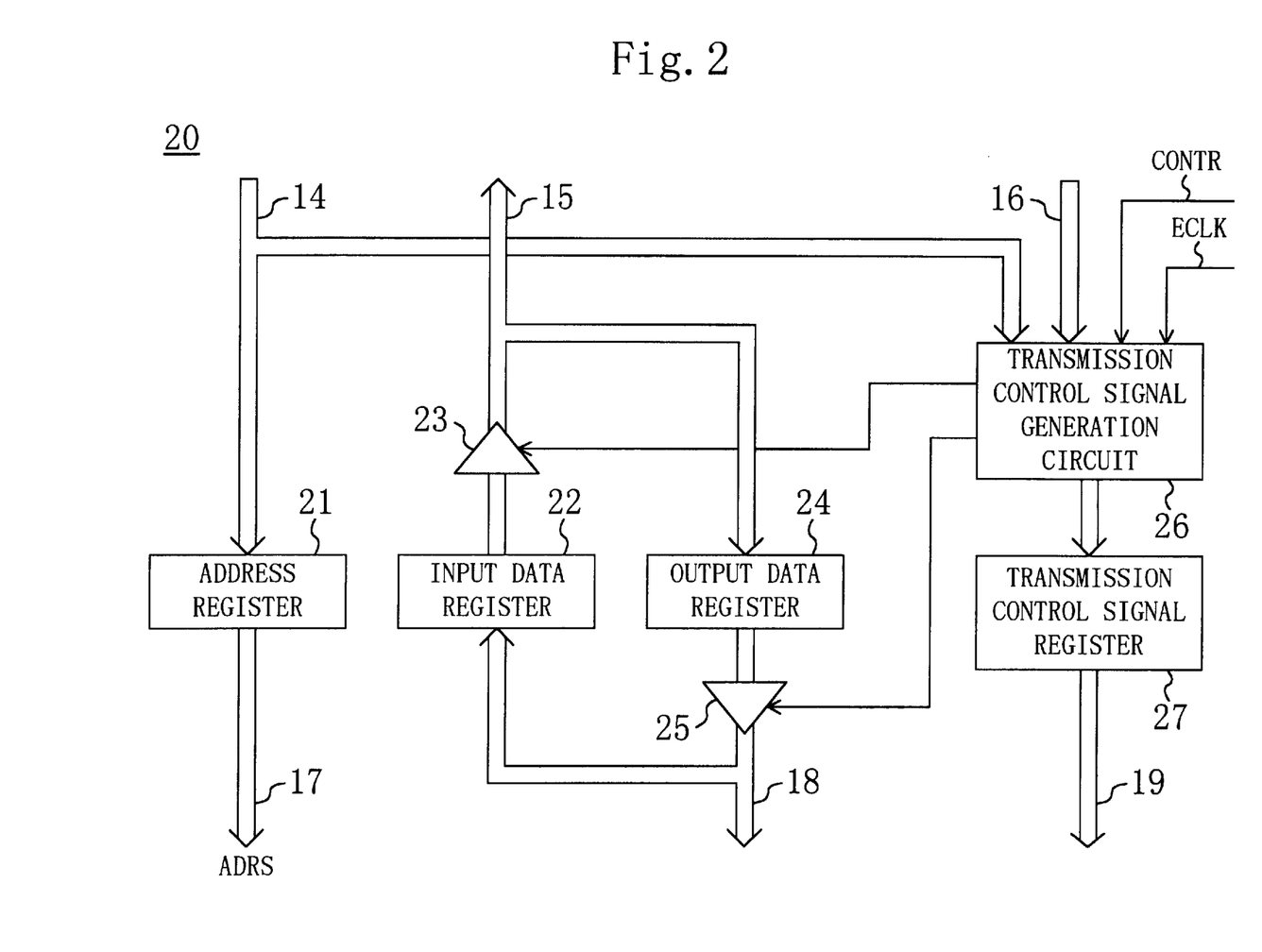
FIG. 2 is a block diagram illustrating the internal organization of a bus interface of FIG. 1.

FIG. 2 shows an internal organization of the bus interface 20. The bus interface 20 has an address register 21, an input data register 22, a tri-state bus buffer 23, an output data register 24, another tri-state bus buffer 25, a transfer control signal generation circuit 26, and a transfer control signal register 27. The address register 21 holds an address signal ADRS supplied from the CPU 12 over the address bus 14 and provides SIGNAL ADRS to the external device 2 over the address bus 17. The input data register 22 holds a data signal supplied from the external device 2 over the data bus 18. The data signal held in the input data register 22 is applied via the bus buffer 23 and the data bus 15 to the CPU 12. The output data register 24 holds a data signal supplied from the CPU 12 over the data bus 15. The data signal held in the output data register 24 is applied via the bus buffer 25 and the data bus 18 to the external device 2. The transmission control signal generation circuit 26 is coupled by way of the control bus 16 to the CPU 12, receives SIGNAL CONTR supplied from the state control circuit 40 and SIGNAL ECLK, and generates a transmission control signal while controlling the direction in which data is transmitted. When the external device 2 needs a chip select signal, signals on the address bus 14 are partly used for generating the chip select signal. The transmission control signal register 27 holds the transmission control signal generated. The signal held in the transmission control signal register 27 is supplied to the external device 2 via the control bus 19. The bus interface 20 of FIG. 2 has the function to supply SIGNAL ADRS, issued from the CPU 12 together with SIGNAL REQ, to the external device 2 and further has the function to hold SIGNAL ADRS in the address register 21 until data transmission starts between the CPU 12 and the external device 2 in synchronization with the rising edge of SIGNAL ECLK in the transmission state.

Figure 3:
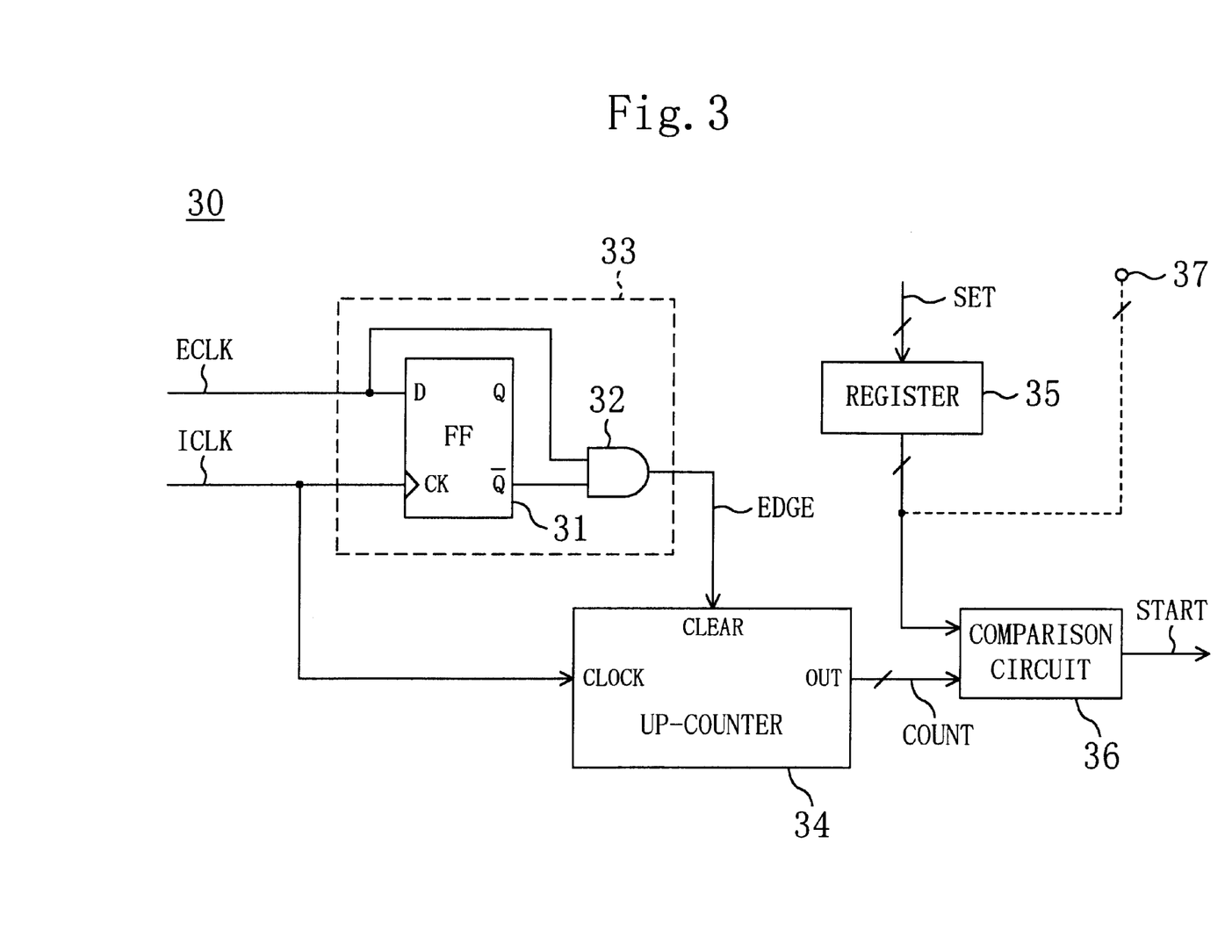
FIG. 3 is a block diagram illustrating the internal organization of a start signal generation circuit of FIG. 1.

FIG. 3 illustrates an internal organization of the start signal generation circuit 30. The start signal generation circuit 30 has an edge detection circuit 33, an up-counter 34, a register 35, and a comparison circuit 36. The edge detection circuit 33 is formed of a D flip-flop 31 and an AND gate 32 for detecting the presence of a rising edge of SIGNAL ECLK. The up-counter 34 is cleared to zero at the time when the presence of a rising edge of SIGNAL ECLK is detected and thereafter up-counts or counts in ascending order the number of pulses of SIGNAL ICLK. The register 35 stores SIGNAL SET received from the CPU 12. The comparison circuit 36 makes a comparison between a count value signal COUNT of the up-counter 34 and SIGNAL SET stored in the register 35. The edge detection circuit 33 generates an edge detection signal EDGE which is held HIGH just for one sub-period equivalent to one cycle period of SIGNAL ICLK from the time SIGNAL ECLK rises. This SIGNAL EDGE is applied to a clear terminal of the up-counter 34, and the up-counter 34 starts counting the number of rising edges of SIGNAL ICLK. Accordingly, SIGNAL COUNT represents 0, 1, 2, or 3. The comparison circuit 36 provides SIGNAL START when SIGNAL COUNT and SIGNAL SET stored in the register 35 agree. It may be arranged such that SIGNAL SET is applied from external pins 37 of the data processor 1 directly to the comparison circuit 36.

Figure 4:
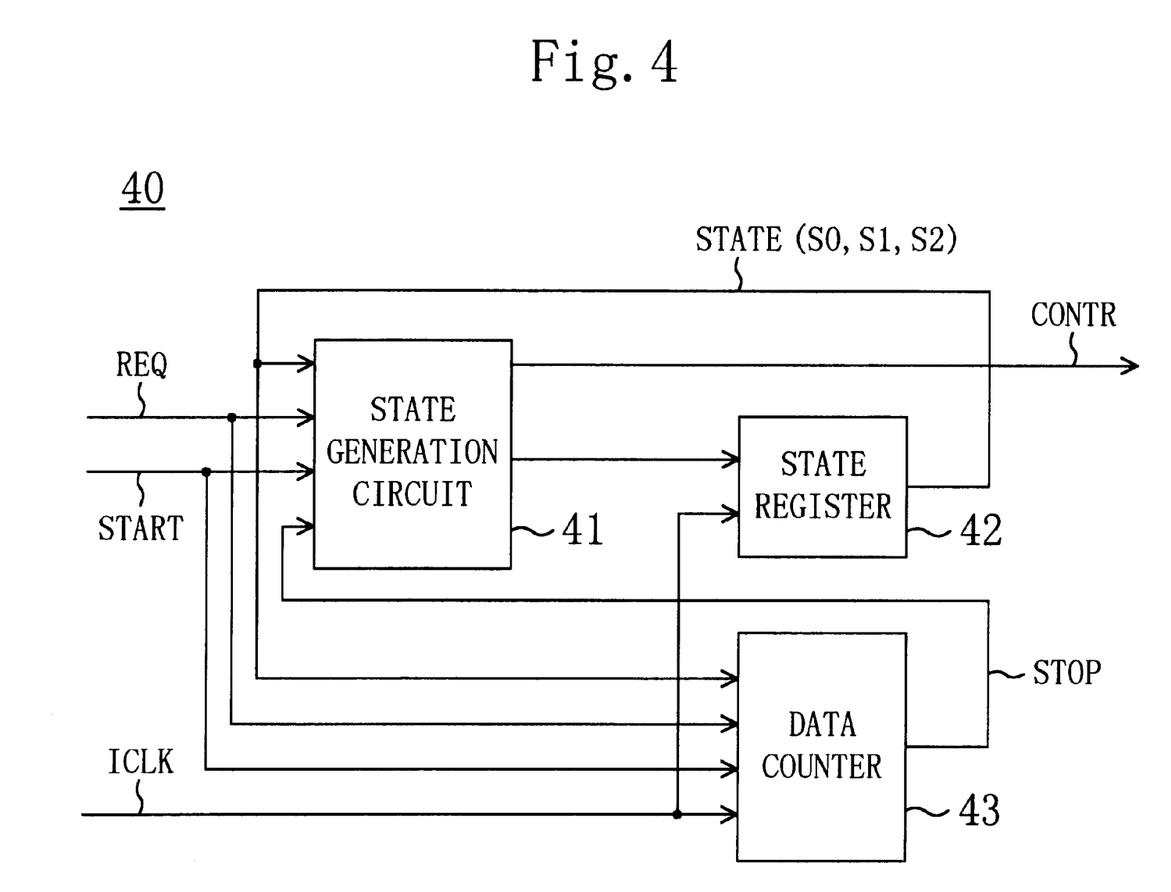
FIG. 4 is a block diagram illustrating the internal organization of a state control circuit of FIG. 1.

FIG. 4 shows an internal organization of the state control circuit 40. The state control circuit 40 has a state generation circuit 41, a state register 42, and a data counter 43. The state register 42 stores a state signal STATE indicating which of a request wait state S0, a start wait state S1, and a transmission state S2 is the current internal state of the data processor 1. The data counter 43 counts the number of items of data transmitted, to generate a stop signal STOP for terminating data transmission. The state register 42 and the data counter 43 are updated in synchronization with the rising edge of SIGNAL ICLK. Based on SIGNAL STATE stored in the state register 42, SIGNAL REQ issued from the CPU 12, SIGNAL START generated in the start signal generation circuit 30, and SIGNAL STOP generated in the data counter 43, the state generation circuit 41 updates the state register 42. Further, the state generation circuit 41 updates SIGNAL CONTR that is fed to the bus interface 20.

Figure 5:
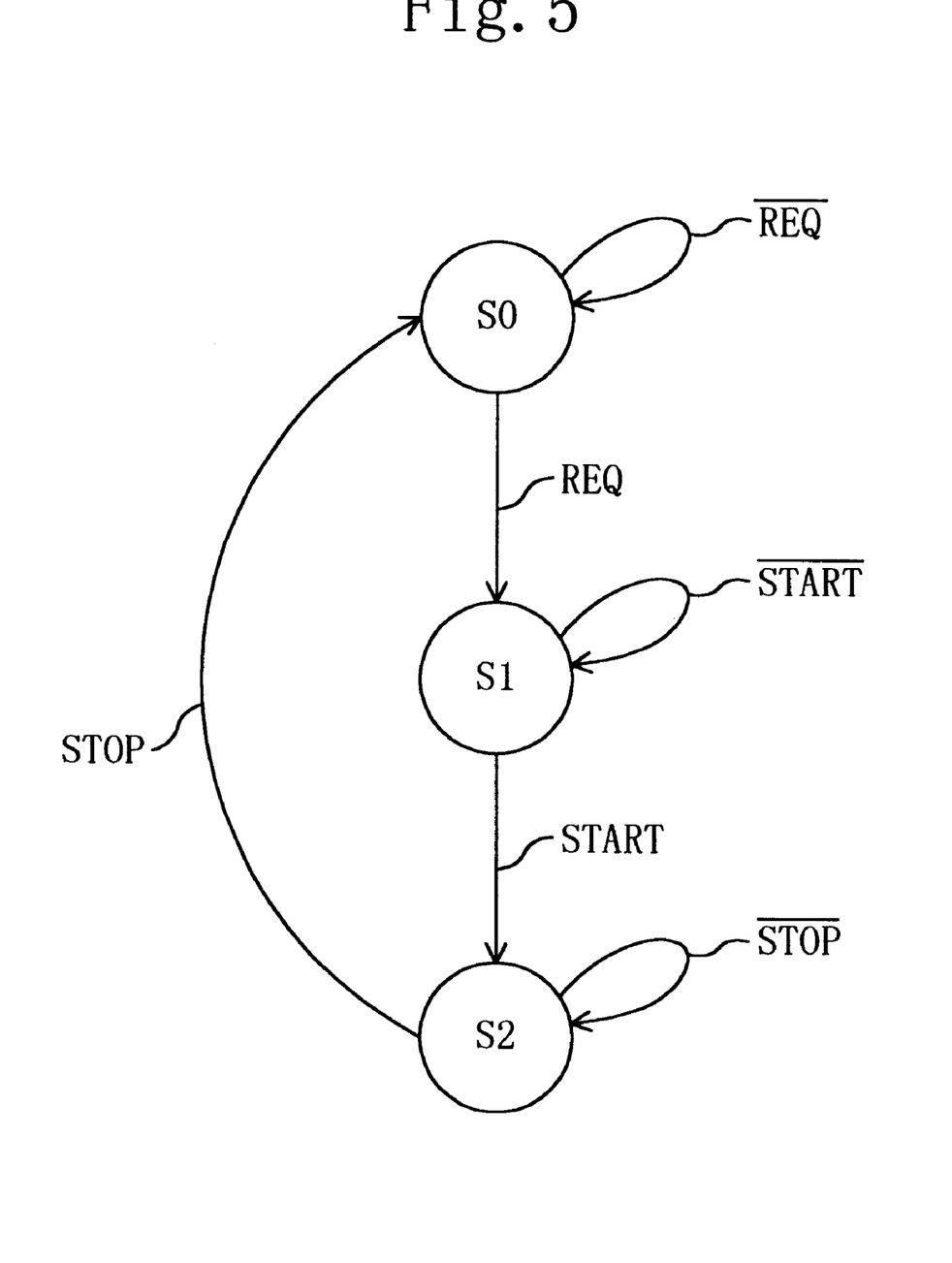
FIG. 5 is a state transition diagram of the data processor of FIG. 1.

FIG. 5 shows how the data processor 1 changes in its internal state. The data processor 1 remains in the request wait state S0 until the CPU 12 sends SIGNAL REQ. When the state generation circuit 41 receives SIGNAL REQ, the data processor 1 makes a transition from the request wait state S0 to the start wait state S1. The data processor 1 then remains in the start wait state S1 until SIGNAL START is generated. When the state generation circuit 41 receives SIGNAL START, the data processor 1 makes a transition from the start wait state S1 to the transmission state S2. The data processor 1 then remains in the transmission state S2 until the data counter 43 generates SIGNAL STOP. When the state generation circuit 41 receives SIGNAL STOP, the data processor 1 makes a transition from the transmission state S2 back to the request wait state S0.

Prior to data transmission, the CPU 12 sends SIGNAL SET to the start signal generation circuit 30 to allow SIGNAL START to select a sub-period at a corresponding position to the setup time of the external device 2. Concretely, if one cycle period of SIGNAL ICLK is T and the setup time of the external device 2 is Ts, then SET=0 for Ts=4T, SET=1 for Ts=3T, SET=2 for Ts=2T, and SET=3 for Ts=1. The CPU 12 is able to issue SIGNAL REQ in any one of the four sub-periods resulting from equal division of one cycle period of SIGNAL ECLK.

Figure 6:
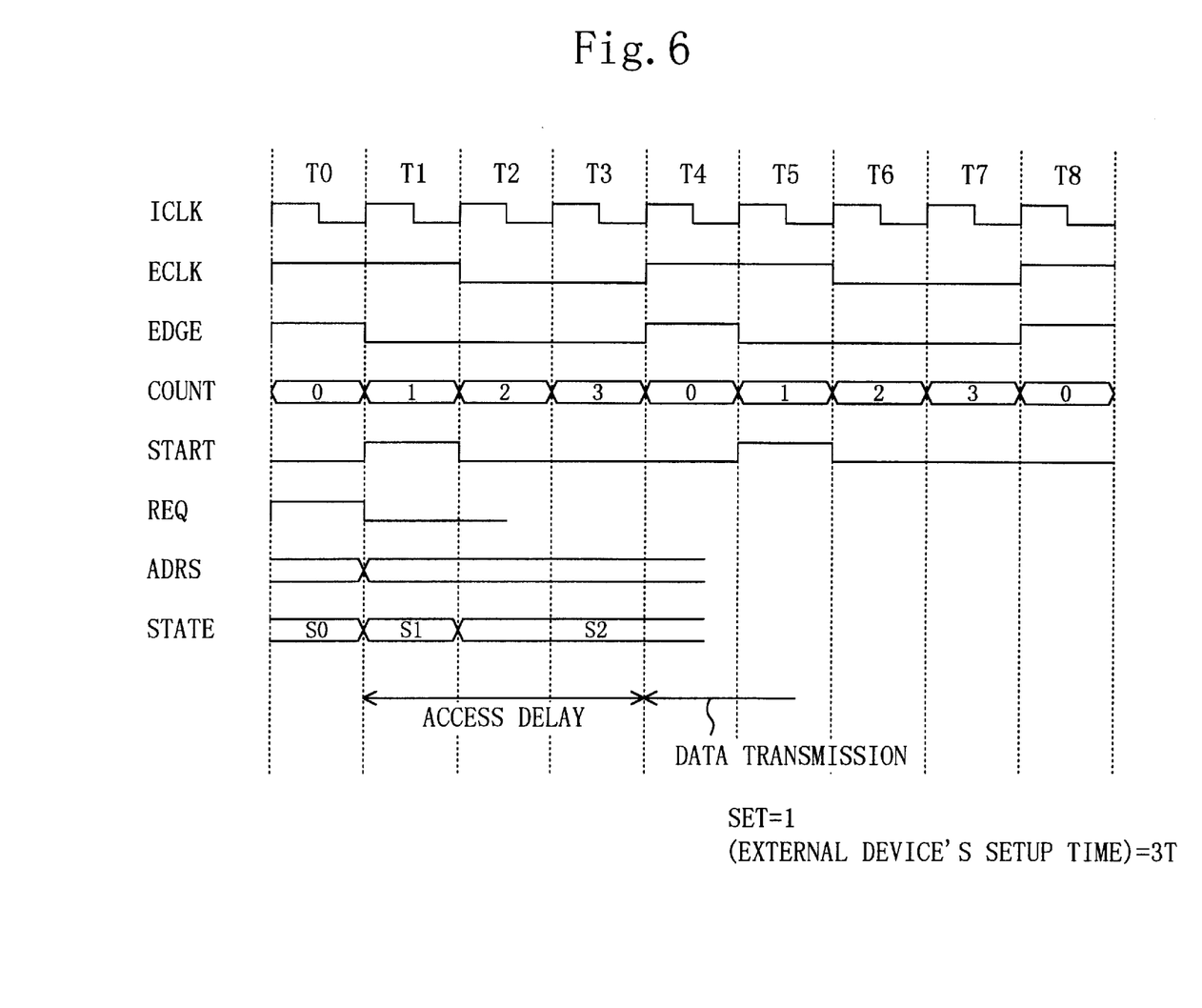
FIG. 6 shows a first operation timing chart of the data processor of FIG. 1 when a register of FIG. 3 is set at a value of 1.

FIG. 6 shows an operation timing of the data processor 1 when SET=1 (Ts=3T) and when SIGNAL REQ is issued in the sub-period T0. Sub-periods are represented respectively T0, T1, T2, T3, T4, T5, T6, T7, and T8. Referring to FIG. 6, since SET=1, then SIGNAL START is generated in the sub-periods T1 and T5. The internal state makes a transition from the request wait state S0 to the start wait state S1 at the time when the sub-period T1 starts and then makes another transition from the start wait state S1 to the transmission state S2 at the time when the sub-period T2 starts. From the time SIGNAL ECLK succeedingly rises, that is, from the time the sub-period T4 starts, actual data transmission starts between the CPU 12 and the external device 2. If a length of time from a sub-period in which SIGNAL REQ is issued to another in which actual data transmission commences is defined as an access delay, the access delay in this case is 3T. Since SIGNAL ADRS is determined at the time when the sub-period T1 starts, this secures a setup time of 3T for the external device 2.

Figure 7:
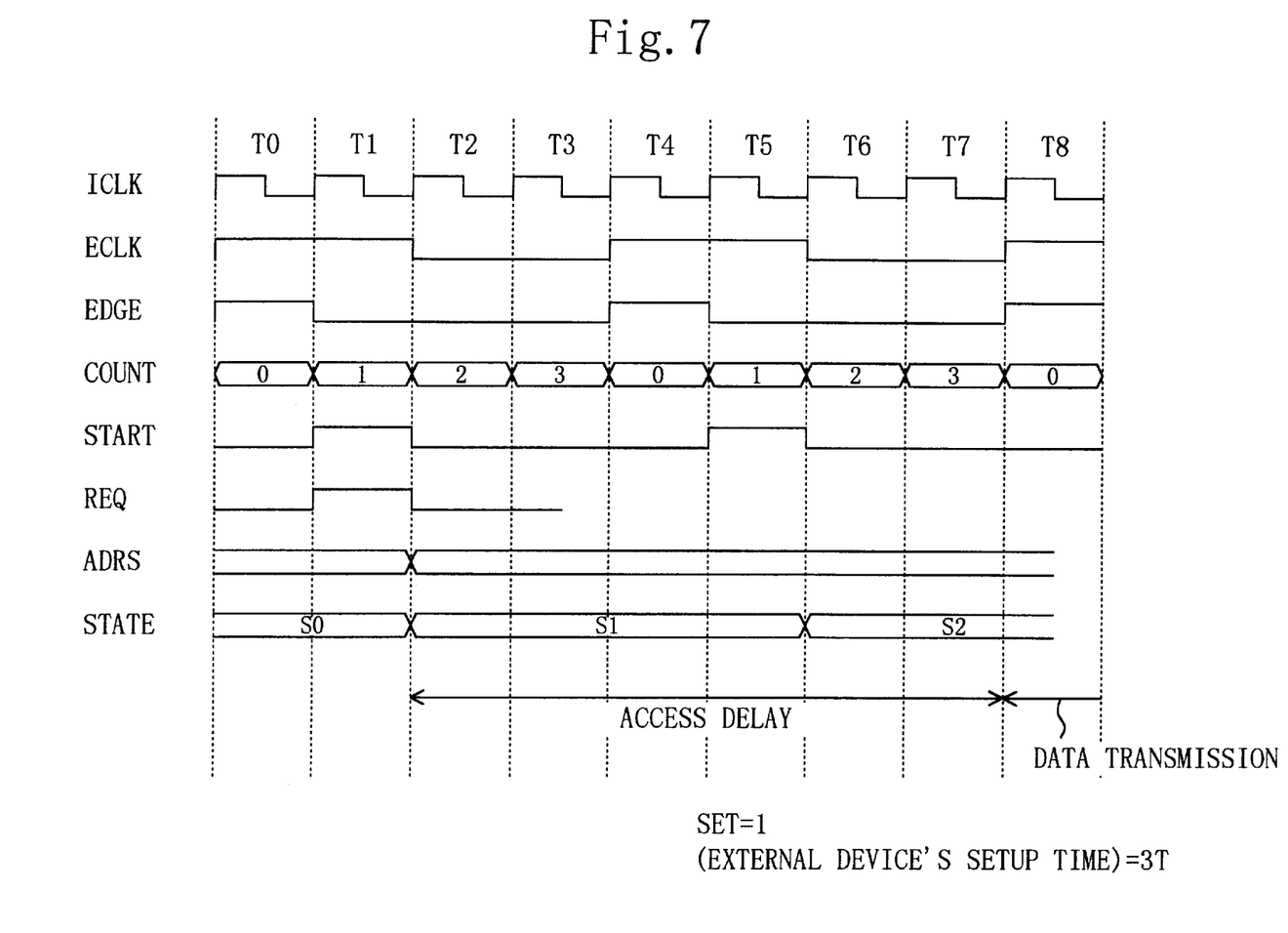
FIG. 7 shows a second operation timing chart of the data processor of FIG. 1 when the register of FIG. 3 is set at a value of 1.

FIG. 7 shows an operation timing of the data processor 1 when SET=1 (Ts=3T) and when SIGNAL REQ is issued in the sub-period T1. Referring to FIG. 7, since SET=1, then SIGNAL START is generated in the sub-periods T1 and T5. The internal state makes a transition from the request wait state S0 to the start wait state S1 at the time when the sub-period T2 starts and then makes another transition from the start wait state S1 to the transmission state S2 at the time when the sub-period T6 starts. From the time SIGNAL ECLK succeedingly rises, that is, from the time the sub-period T8 starts, actual data transmission starts between the CPU 12 and the external device 2. The access delay in this case is 6T. Since SIGNAL ADRS is determined at the time when the sub-period T2 starts, this secures a setup time of 3T for the external device 2. If actual data transmission between the CPU 12 and the external device 2 starts at the time when the sub-period T4 starts, then it is required to pay attention to the fact that a setup time of 3T is not secured for the external device 2.

Figure 8:
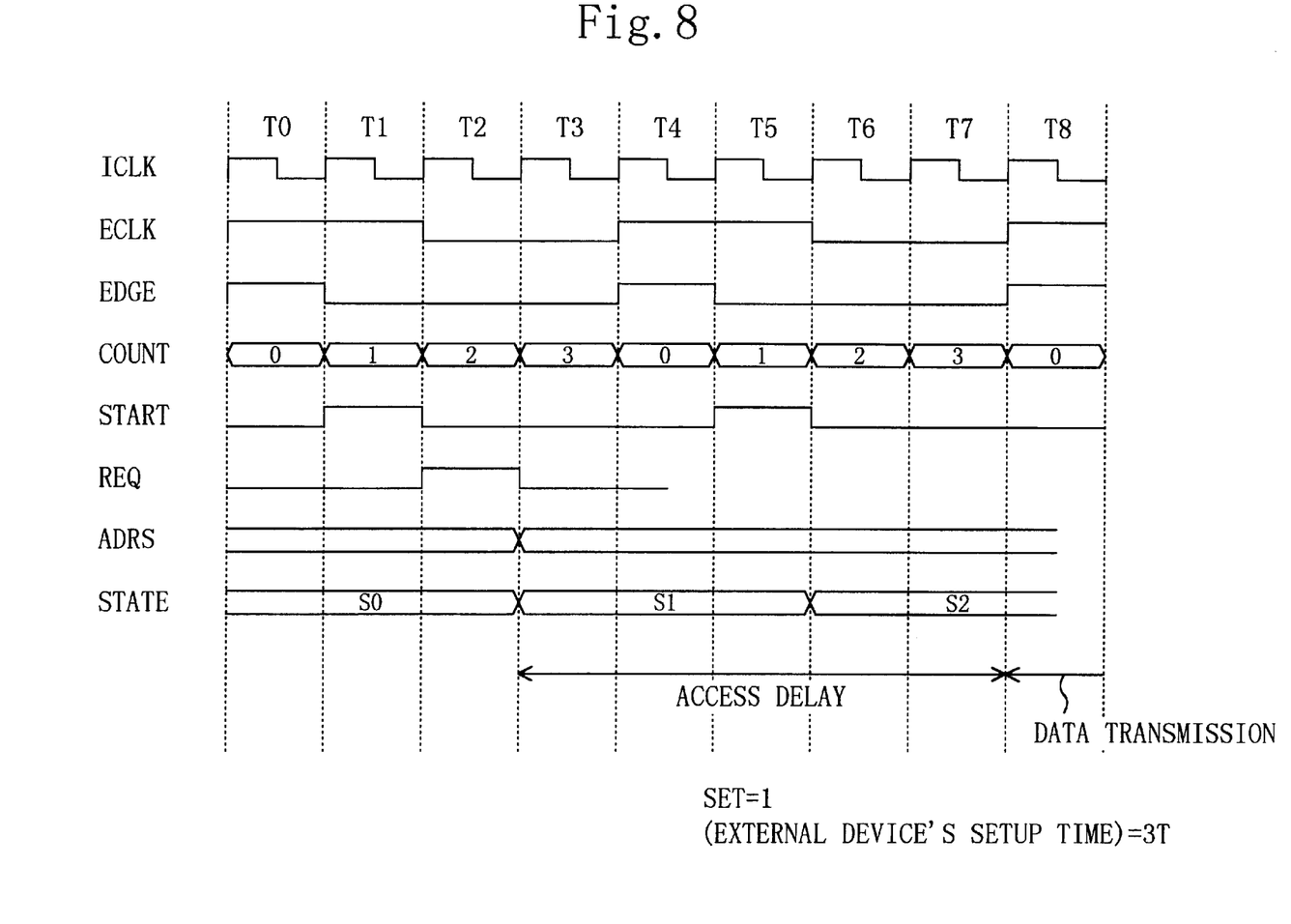
FIG. 8 shows a third operation timing chart of the data processor of FIG. 1 when the register of FIG. 3 is set at a value of 1.

FIG. 8 shows an operation timing of the data processor 1 when SET=1 (Ts=3T) and when SIGNAL REQ is issued in the sub-period T2. Referring to FIG. 8, since SET=1, then SIGNAL START is generated in the sub-periods T1 and T5. The internal state makes a transition from the request wait state S0 to the start wait state S1 at the time when the sub-period T3 starts and then makes another transition from the start wait state S1 to the transmission state S2 at the time when the sub-period T6 starts. From the time SIGNAL ECLK succeedingly rises, that is, from the time the sub-period T8 starts, actual data transmission starts between the CPU 12 and the external device 2. The access delay in this case is 5T. Since SIGNAL ADRS is determined at the time when the sub-period T3 starts, this secures a setup time of 3T for the external device 2.

Figure 9:
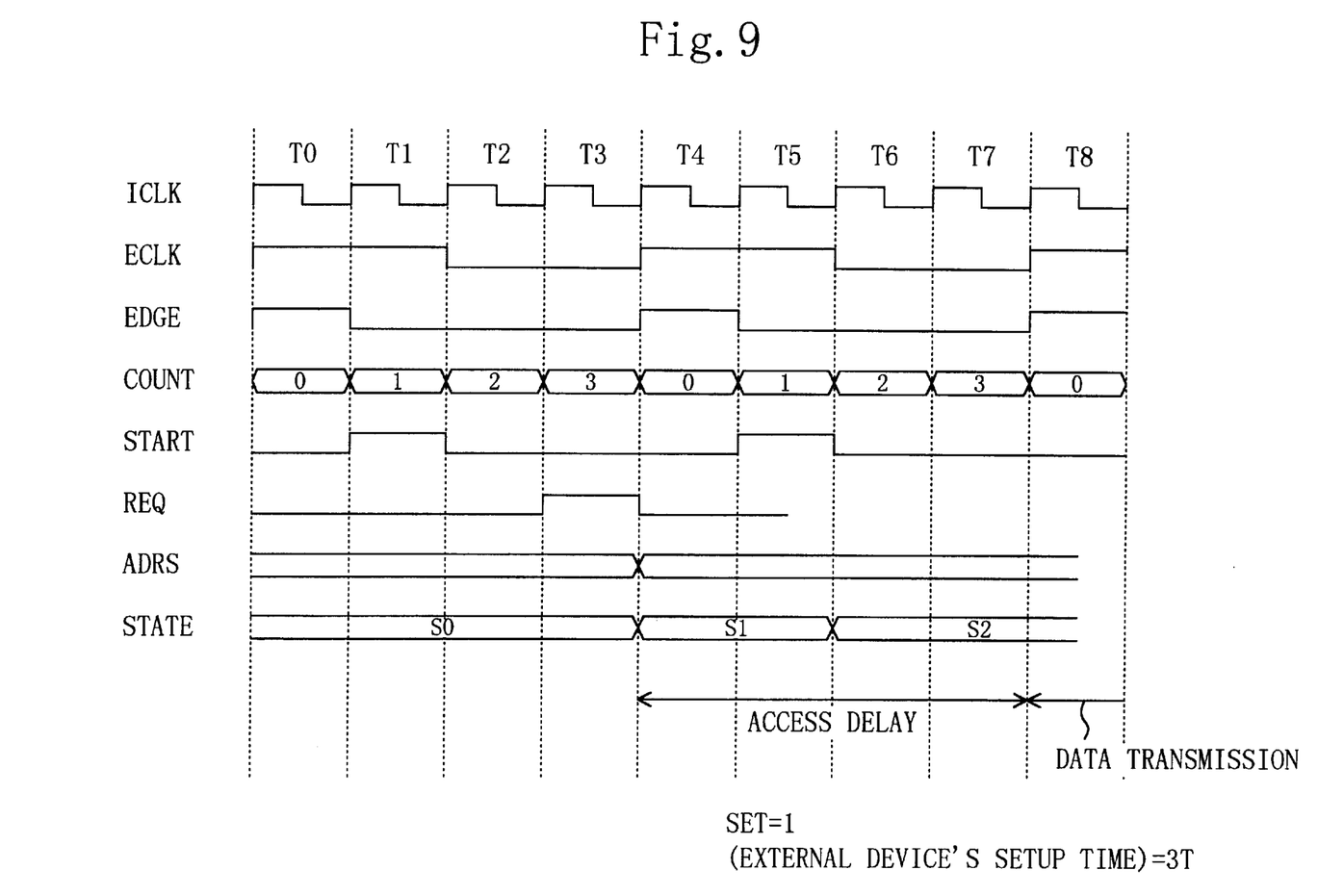
FIG. 9 shows a fourth operation timing chart of the data processor of FIG. 1 when the register of FIG. 3 is set at a value of 1.

FIG. 9 shows an operation timing of the data processor 1 when SET=1 (Ts=3T) and when SIGNAL REQ is issued in the sub-period T3. Referring to FIG. 9, since SET=1, then SIGNAL START is generated in the sub-periods T1 and T5. The internal state makes a transition from the request wait state S0 to the start wait state S1 at the time when the sub-period T4 starts and then makes another transition from the start wait state S1 to the transmission state S2 at the time when the sub-period T6 starts. From the time SIGNAL ECLK succeedingly rises, that is, from the time the sub-period T8 starts, actual data transmission starts between the CPU 12 and the external device 2. The access delay in this case is 4T. Since SIGNAL ADRS is determined at the time when the sub-period T4 starts, this secures a setup time of 3T for the external device 2.

Figure 10:
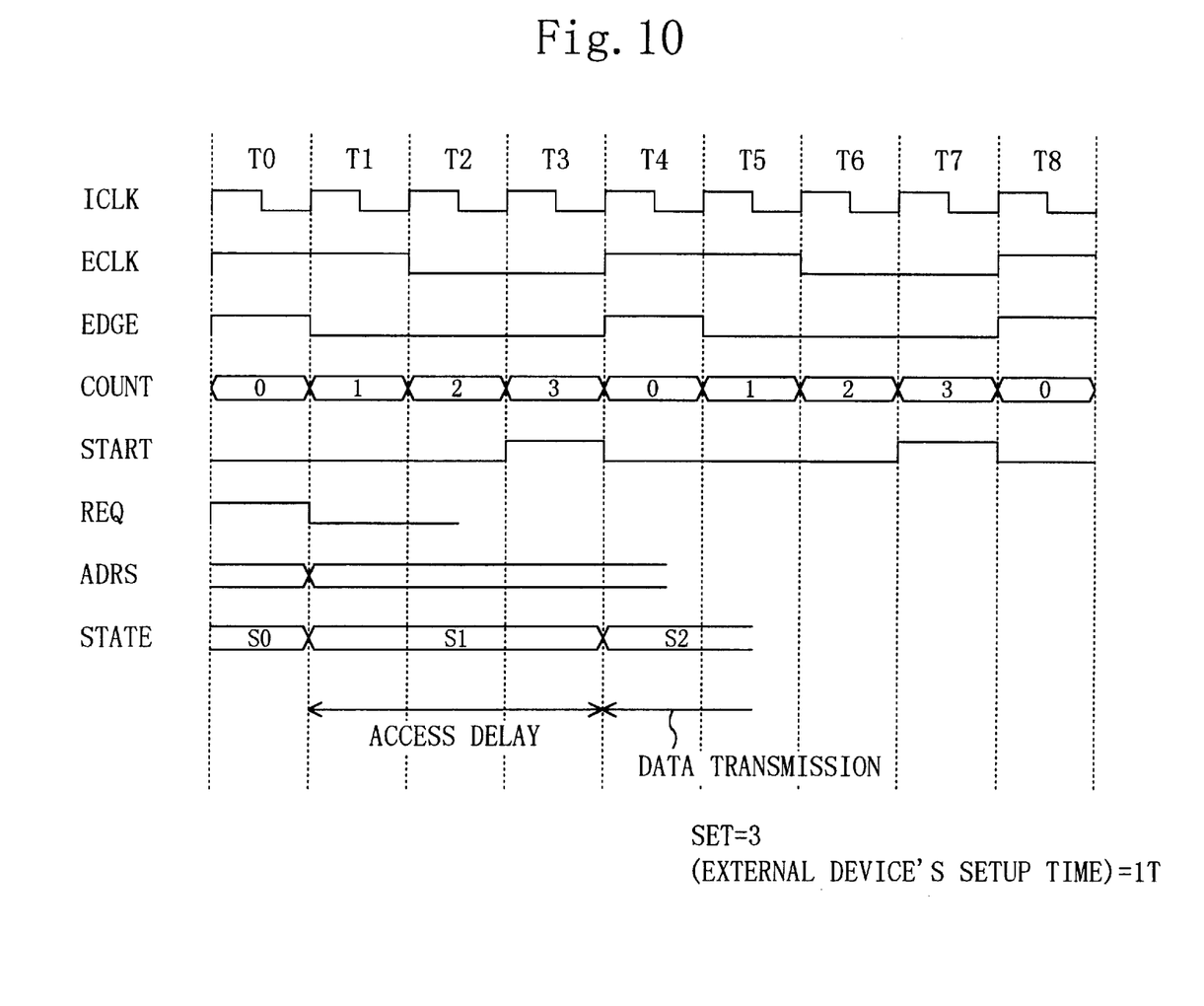
FIG. 10 shows a first operation timing chart of the data processor of FIG. 1 when the register of FIG. 3 is set at a value of 3.

FIG. 10 shows an operation timing of the data processor 1 when SET=3 (Ts=1T) and when SIGNAL REQ is issued in the sub-period T0. Referring to FIG. 10, since SET=3, then SIGNAL START is generated in the sub-periods T3 and T7. The internal state makes a transition from the request wait state S0 to the start wait state S1 at the time when the sub-period T1 starts and then makes another transition from the start wait state S1 to the transmission state S2 at the time when the sub-period T4 starts. From the time SIGNAL ECLK rises, that is, from the time the sub-period T4 starts, actual data transmission starts between the CPU 12 and the external device 2. The access delay in this case is 3T. Since SIGNAL ADRS is determined at the time when the sub-period T1 starts, this secures a setup time of 1T for the external device 2.

Figure 11:
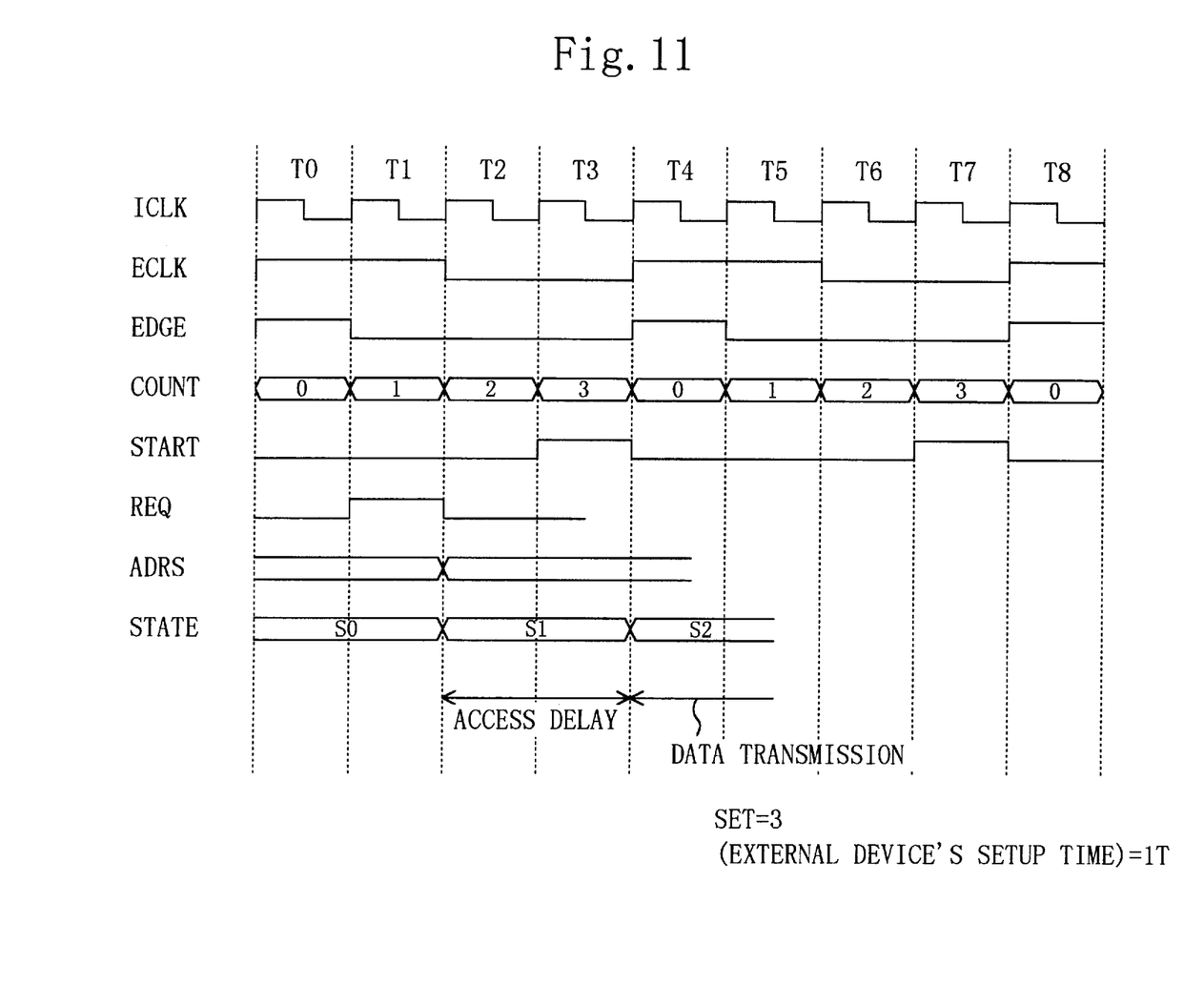
FIG. 11 shows a second operation timing chart of the data processor of FIG. 1 when the register of FIG. 3 is set at a value of 3.

FIG. 11 shows an operation timing of the data processor 1 when SET=3 (Ts=1T) and when SIGNAL REQ is issued in the sub-period T1. Referring to FIG. 11, since SET=3, then SIGNAL START is generated in the sub-periods T3 and T7. The internal state makes a transition from the request wait state S0 to the start wait state S1 at the time when the sub-period T2 starts and then makes another transition from the start wait state S1 to the transmission state S2 at the time when the sub-period T4 starts. From the time SIGNAL ECLK rises, that is, from the time the sub-period T4 starts, actual data transmission starts between the CPU 12 and the external device 2. The access delay in this case is 2T. Since SIGNAL ADRS is determined at the time when the sub-period T2 starts, this secures a setup time of 1T for the external device 2.

Figure 12:
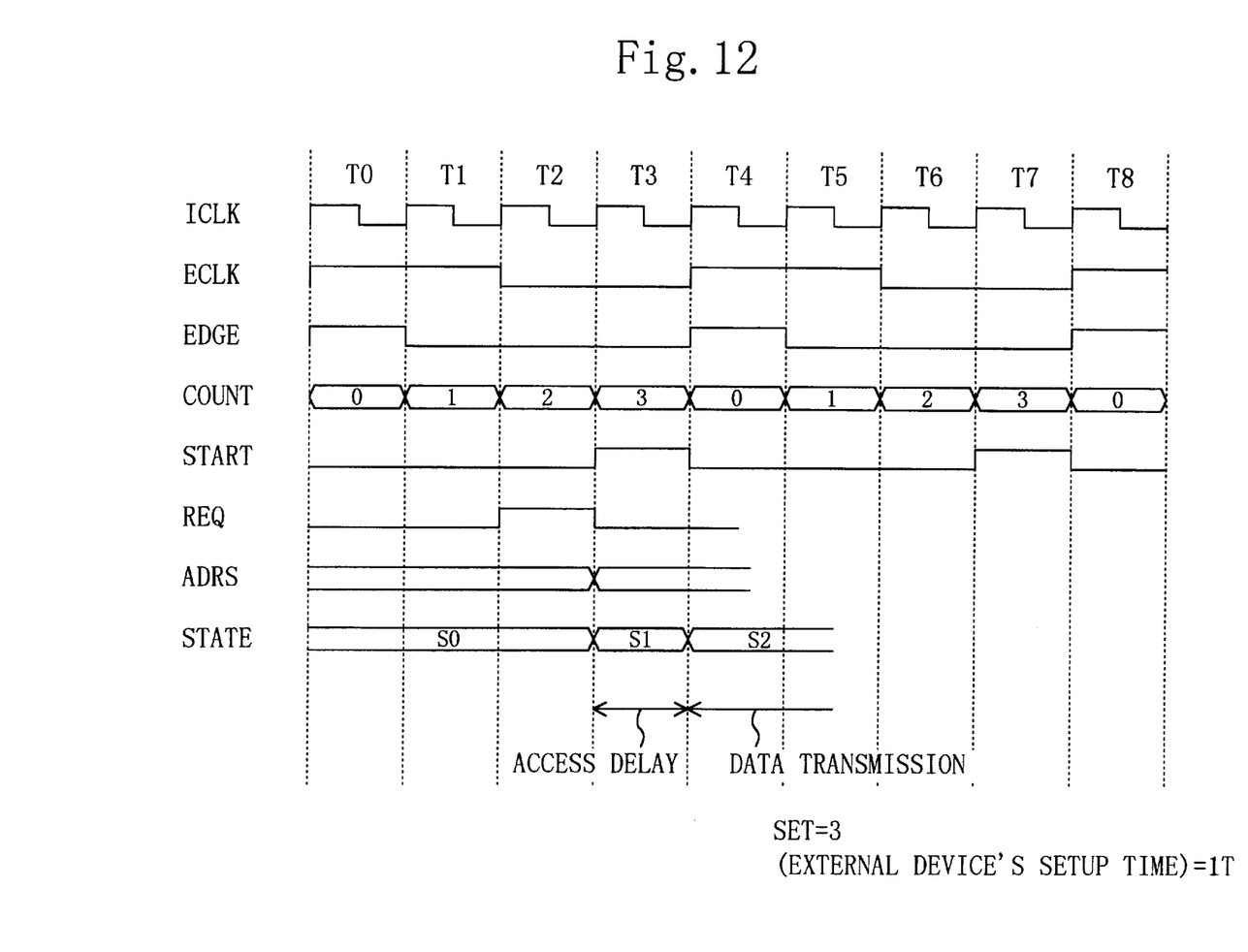
FIG. 12 shows a third operation timing chart of the data processor of FIG. 1 when the register of FIG. 3 is set at a value of 3.

FIG. 12 shows an operation timing of the data processor 1 when SET=3 (Ts=1T) and when SIGNAL REQ is issued in the sub-period T2. Referring to FIG. 12, since SET=3, then SIGNAL START is generated in the sub-periods T3 and T7. The internal state makes a transition from the request wait state S0 to the start wait state S1 at the time when the sub-period T3 starts and then makes another transition from the start wait state S1 to the transmission state S2 at the time when the sub-period T4 starts. From the time SIGNAL ECLK rises, that is, from the time the sub-period T4 starts, actual data transmission starts between the CPU 12 and the external device 2. The access delay in this case is 1T. Since SIGNAL ADRS is determined at the time when the sub-period T3 starts, this secures a setup time of 1T for the external device 2.

Figure 13:
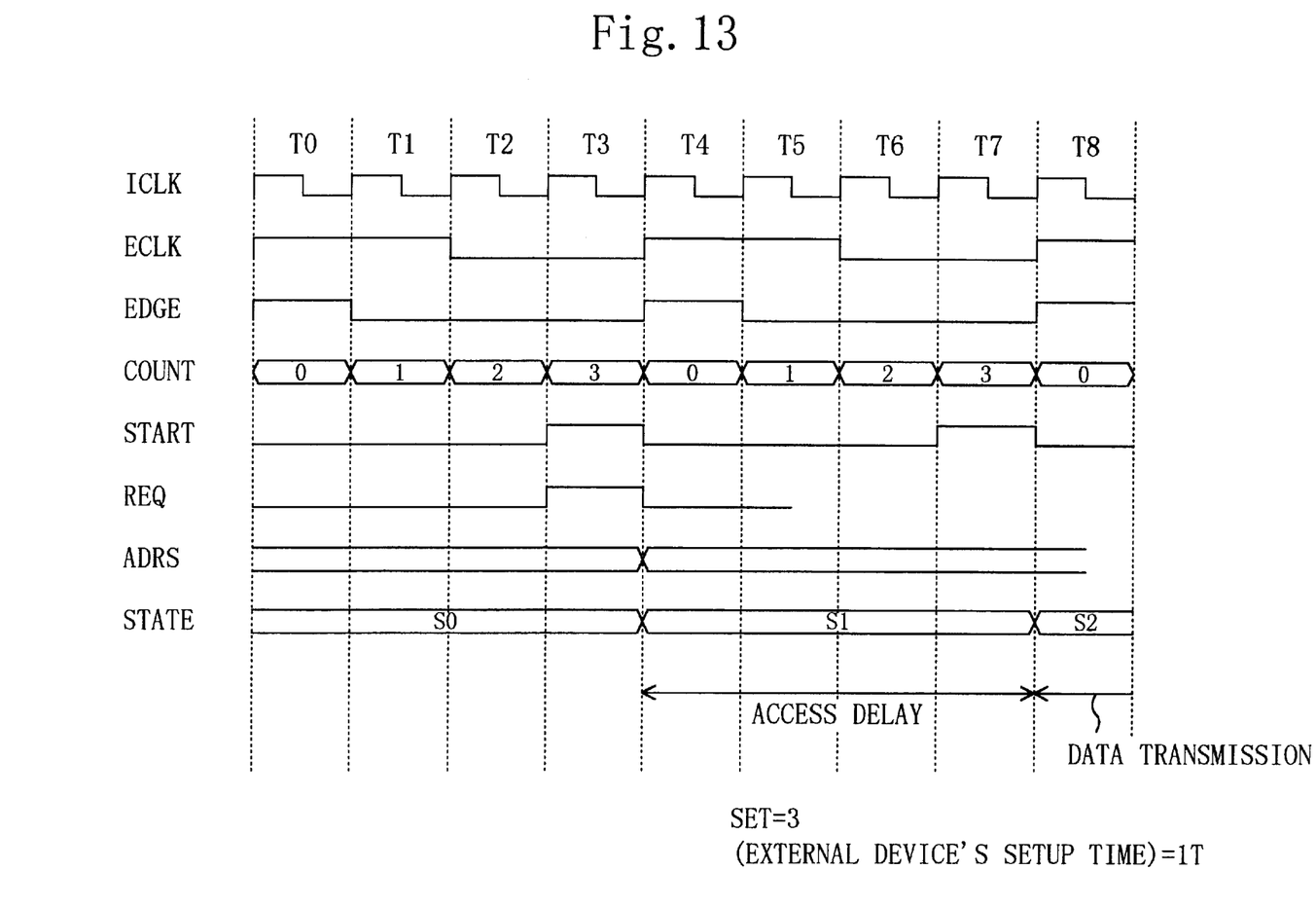
FIG. 13 shows a fourth operation timing chart of the data processor of FIG. 1 when the register of FIG. 3 is set at a value of 3.

FIG. 13 shows an operation timing of the data processor 1 when SET=3 (Ts=1T) and when SIGNAL REQ is issued in the sub-period T3. Referring to FIG. 13, since SET=3, then SIGNAL START is generated in the sub-periods T3 and T7. The internal state makes a transition from the request wait state S0 to the start wait state S1 at the time when the sub-period T4 starts and then makes another transition from the start wait state S1 to the transmission state S2 at the time when the sub-period T8 starts. From the time SIGNAL ECLK rises, that is, from the time the sub-period T8 starts, actual data transmission starts between the CPU 12 and the external device 2. The access delay in this case is 4T. Since SIGNAL ADRS is determined at the time when the sub-period T4 starts, this secures a setup time of 1T for the external device 2.

As described above, in the case that a setting of SET=1 is made correspondingly to Ts=3T, the data processor 1 starts performing actual data transmission at the time when SIGNAL ECLK succeedingly rises if there is left, at the time when SIGNAL REQ is issued, a time of more than 3T to the moment SIGNAL ECLK undergoes the next rise (see FIGS. 6 to 9). If such a time falls below 3T, the data processor 1 waits for SIGNAL ECLK to have undergone the rise after next and then starts performing actual data transmission. On the other hand, in the case that a setting of SET=3 is made correspondingly to Ts=1T, the data processor 1 starts performing actual data transmission at the time when SIGNAL ECLK succeedingly rises if there is left, at the time when SIGNAL REQ is issued, a time of more than 1T to the moment SIGNAL ECLK undergoes the next rise (see FIGS. 10 to 13). If such a time falls below 1T, the data processor 1 waits for SIGNAL ECLK to have undergone the rise after next and then starts performing actual data transmission. In other words, by the above-described data processor 1 of the present invention, it becomes possible to change the time when to start the transmission of data according to the setup time (Ts) of the external device 2. Accordingly, the setup time of various external devices can be guaranteed and the transmission of data in synchronization with SIGNAL ECLK can be accomplished.

Figure 14:
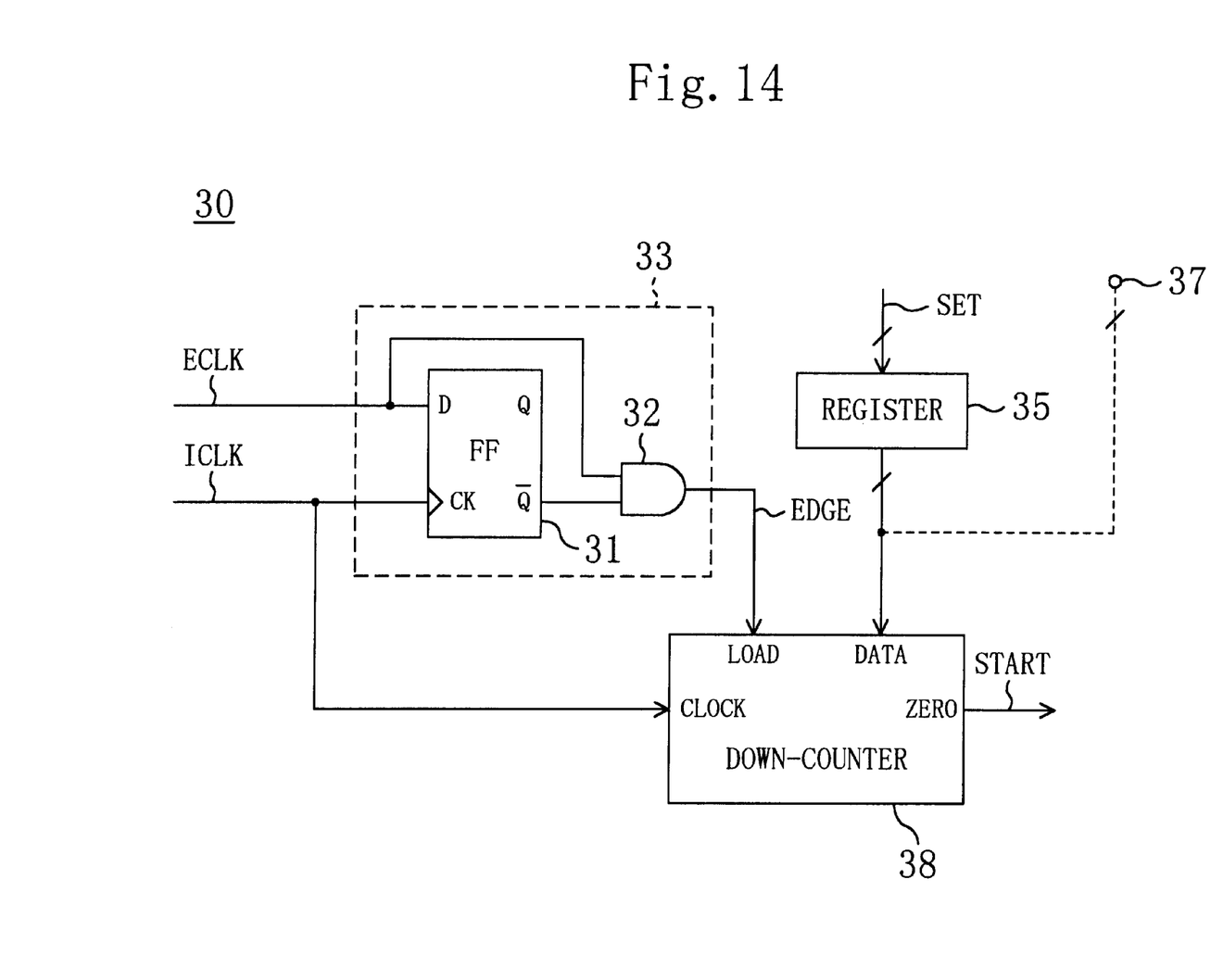
FIG. 14 illustrates in block form a modification of the start signal generation circuit of FIG. 3.

FIG. 14 shows a modification of the start signal generation circuit 30. The circuit 30 of FIG. 14 has an edge detection circuit 33, a down-counter 38, and a register 35. The edge detection circuit 33 is formed of a D flip-flop 31 and an AND gate 32, to detect the presence of a rising edge of SIGNAL ECLK. The down-counter 38 down-counts or counts in descending order the number of pulses of SIGNAL ICLK after an initial value signal is loaded at the time when the presence of a rising edge of SIGNAL ECLK is detected and generates SIGNAL START when the count value of the down-counter 38 reaches zero. The register 35 stores SIGNAL SET supplied from the CPU 12 as an initial value signal to be applied to the down-counter 38. The down-counter 38 has a load terminal at which SIGNAL EDGE is applied and a data terminal at which SIGNAL SET (initial value) stored in the register 35 is applied. The organization of FIG. 14 makes it possible to generate SIGNAL START which selects any one of the four sub-periods as a result of equal-division of one cycle period of SIGNAL ECLK, without providing comparison circuits. It may be arranged such that SIGNAL SET is applied from external pins 37 of the data processor 1 directly to the down-counter 38.

In the description above, the frequency of SIGNAL ICLK is four times that of SIGNAL ECLK. However, any frequency multiplication rate of SIGNAL ECLK to SIGNAL ICLK may be used. Additionally, handshaking control between the CPU 12 and the external device 2 is possible.

What is claimed is:

1. A data processor for performing, in synchronization with an external clock signal supplied, data transmission with an external device having a specific setup time, said data processor comprising:

a clock generation circuit for generating from said external clock signal an internal clock signal having a frequency which is an integral multiple of that of said external clock signal;

processing means for processing data in synchronization with said internal clock signal;

a bus interface for controlling data transmission between said processing means and said external device;

a start signal generation circuit for generating a start signal which selects, from among a plurality of sub-periods resulting from division of one cycle period of said external clock signal and each having a length equivalent to one cycle period of said internal clock signal, a sub-period at a corresponding position to said setup time of said external device; and a state control circuit for controlling an internal state of said data processor in order that said data processor may make a transition to a state of transmission when said state control circuit receives said start signal after having received a transmission request signal issued from said processing means in synchronization with said internal clock signal;

wherein said bus interface has a function to pass an address signal, issued together with said transmission request signal from said processing means, to said external device and further has a function to hold said address signal that is fed to said external device until data transmission starts between said processing means and said external device in said transmission state in synchronization with said external clock signal.

2. The data processor of claim 1, said start signal generation circuit including:

an edge detection circuit for detecting the presence of an edge of said external clock signal;

an up-counter for up-counting the number of pulses of said internal clock signal after said up-counter is cleared at the time when the presence of an edge of said external clock signal is detected; and a comparison circuit for receiving a set value and for making a comparison between a count value of said up-counter and said set value to generate said start signal when said values agree.

3. The data processor of claim 2 further comprising a register for storing a supplied set value for forwarding to said comparison circuit.

4. The data processor of claim 3 wherein said register stores a set value supplied from said processing means.

5. The data processor of claim 2 further comprising an external pin at which a set value received from outside said data processor is supplied to said comparison circuit.

6. The data processor of claim 1, said start signal generation circuit including:

an edge detection circuit for detecting the presence of an edge of said external clock signal; and a down-counter for down-counting the number of pulses of said internal clock signal after an initial value is loaded into said down-counter at the time when the presence of an edge of said external clock signal is detected and for generating said start signal when said down-counter reaches zero.

7. The data processor of claim 6 further comprising a register for storing a supplied initial value for forwarding to said down-counter.

8. The data processor of claim 7 wherein said register stores an initial value supplied from said processing means.

9. The data processor of claim 6 further comprising an external pin at which an initial value received from outside said data processor is supplied to said down-counter.

10. The data processor of claim 1, said bus interface including:

an address register for holding an address signal to be supplied to said external device;

an input data register for holding a data signal supplied from said external device; and an output data register for holding a data signal to be supplied to said external device.

11. The data processor of claim 1, said state control circuit including:

a state register for storing a state signal indicative of the current internal state of said data processor; and a state generation circuit for generating, based on said state signal stored in said state register, said transmission request signal, and said start signal, a new state signal to update said state register.

12. The data processor of claim 11 further comprising a data counter for supplying a stop signal to said state generation circuit to terminate said data transmission.

* * * * *